United States Patent [19]
Dian

[11] 3,890,847
[45] June 24, 1975

[54] FRONT DERAILLER FOR BICYCLES
[75] Inventor: Walter Dian, Downers Grove, Ill.
[73] Assignee: Beatrice Foods Company, Elgin, Ill.
[22] Filed: Apr. 12, 1974
[21] Appl. No.: 460,542

[52] U.S. Cl. ................ 74/217 B; 280/238; 280/261
[51] Int. Cl. ..... F16h 11/04; B62m 9/00; B62m 1/02
[58] Field of Search ........... 74/217 B; 280/236, 237, 280/238, 261

[56] References Cited
UNITED STATES PATENTS
3,798,986  3/1974  Clark ................................. 74/217 B
3,813,955  6/1974  Huret et al. ...................... 74/217 B Primary Examiner—Leonard H. Gerin
Attorney, Agent, or Firm—Hill, Gross, Simpson, Van Santen, Steadman, Chiara & Simpson

[57] ABSTRACT

A front derailler for bicycles in which the displaceable fork for engaging the bicycle chain so as to move it between two sprocket plates is controlled by slidable linkage that moves the displaceable fork upwardly away from the bicycle, and wherein the linkage to control the fork is provided with a flexible connection such that if the bicycle is not moving, the control cable can be moved to vary the shift position without injuring the cable or the mechanism.

8 Claims, 5 Drawing Figures

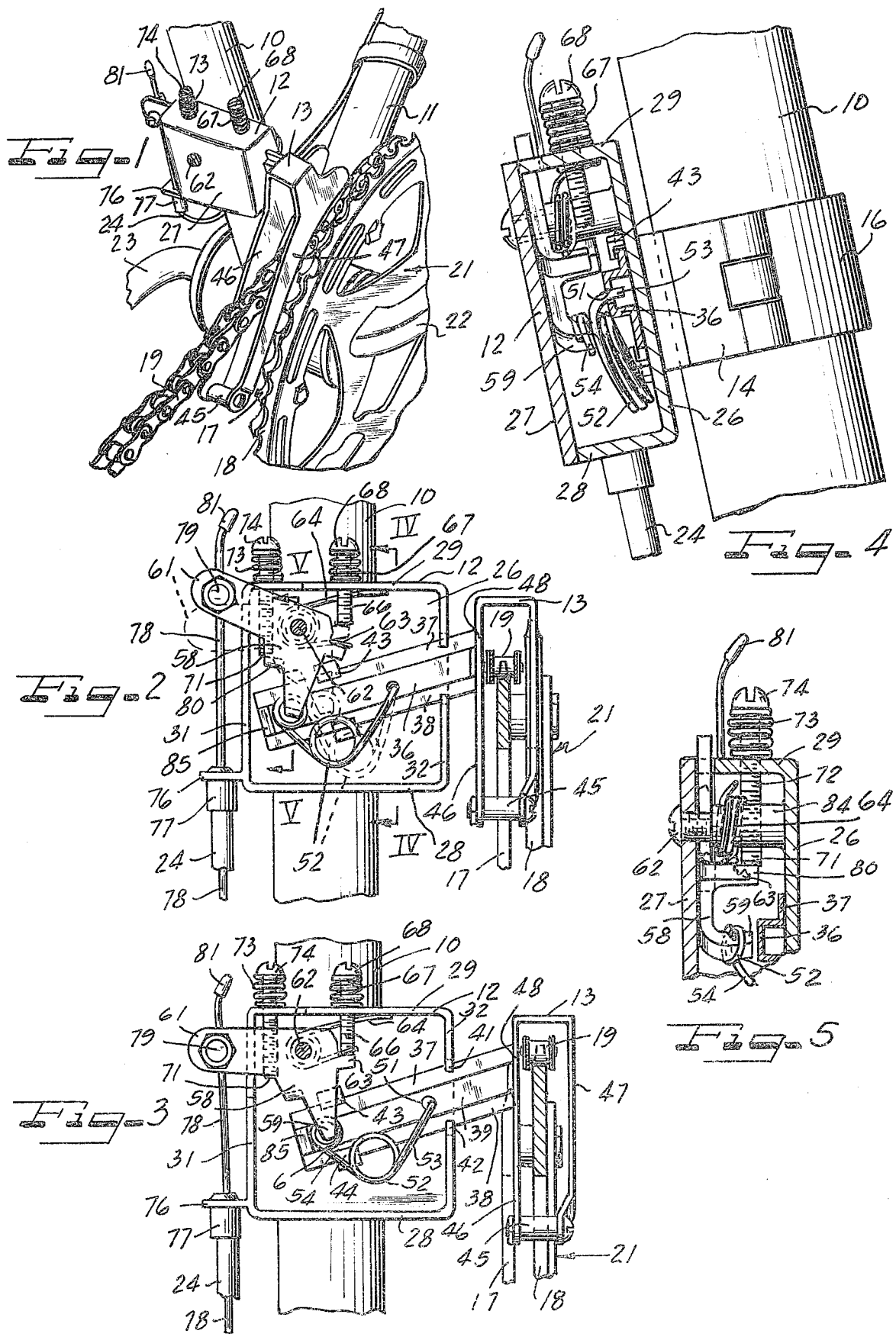

FRONT DERAILLER FOR BICYCLES

BACKGROUND OF THE INVENTION

1. Field of the Invention

This invention relates in general to bicycle derailler mechanisms and in particular to the front derailler for bicycles.

2. Description of the Prior Art

In multiple speed bicycles, two sprocket plates having different diameters are utilized such that the chain can be shifted from one to the other of the sprocket plates thus changing the gear ratio of the bicycle. The displaceable fork is controlled by a parallelogram mechanism controlled by a flexible cable. In such prior art devices, when the bicycle is not moving, the control cable is placed under excessive strain and can be broken if it is attempted to shift gears with the bicycle stationary. Thus, with such devices it is necessary that children and other users be taught not to shift the displaceable fork unless the bicycle is moving and the two sprocket plates are rotating. Inevitably at times, however, users will attempt to shift the displaceable fork when the sprockets are stationary; and, thus, the mechanism including the cable will be subjected to excessive stress which can result in stretching of the cable thus throwing the mechanism out of adjustment and/or breakage of the cable or other parts.

SUMMARY OF THE INVENTION

The present invention relates to an improved front derailler for a bicycle comprising a housing which has a slidable control member upon which the displaceable fork is mounted such that the slide member moves the fork upwardly and outwardly from the bicycle frame. A crank arm linkage is coupled to the slidable member with a flexible connection comprising a spring which normally directly moves the slidable member as the crank arm is rotated. However, if an attempt is made to shift the displaceable fork while the bicycle is stationary and the two sprocket plates are not moving, the crank arm can still move to the shifted position and the flexible spring will allow motion between the crank arm and the slidable member thus preventing excess strain on the control cable and the other parts of the mechansim. Thus, with the present invention the control cable will not be broken or stretched when shifting occurs with the sprocket plates stationary.

Other objects, features and advantages of the invention will be readily apparent from the following description of certain preferred embodiments thereof, taken in conjunction with the accompanying drawing, although variations and modifications may be effected without departing from the spirit and scope of the novel concepts of the disclosure, and in which:

BRIEF DESCRIPTION OF THE DRAWING

FIG. 1 is a partial perspective view of the invention.

FIG. 2 is a partially sectional view of the invention with the cover plate removed.

FIG. 3 is a view similar to FIG. 2 with the fork in the shifted position.

FIG. 4 is a sectional view on line IV — IV from FIG. 2, and

FIG. 5 is a sectional view taken on line V — V in FIG. 2.

DESCRIPTION OF THE PREFERRED EMBODIMENTS

FIG. 1 is a partial sectional view of the invention mounted to control the chain position 19 relative to the sprocket plates 17 and 18 which are mounted side by side in a conventional manner and which are driven by the rotatably supported crank arms 22 and 23 upon which pedals are mounted. The displaceable fork 13 has a pair of side chain engaging legs 46 and 47 through which the chain 19 passes and a pin 45 joins the free ends of the legs 46 and 47.

The mechanism for moving the fork 13 is contained in the housing 12 which is connected as shown in FIG. 4 to the frame member 10 of the bicycle by suitable coupling brackets 14 and 16 and which rigidly attaches the housing 12 to the frame 10.

The frame member 12 is hollow and FIGS. 2 and 3 illustrate the frame member with the cover plate 27 removed. The frame member 12 comprises a back wall 26, top and bottom walls 29 and 28, and side walls 31 and 32. Slidably mounted within the member 12 on the back wall 26 is a actuating slide bar 36 which extends through an opening 40 formed in the wall 32 which has a contour so as to provide a thinner portion 41 for engaging the thinner portion 37 of the top part of the member 36. The opening also has a projection 42 for engaging a thinner portion 38 of the bottom portion of the member 36. Guide members 43 and 44 are attached to the back plate 26 remote from the opening 40 and with the opening 40 provide guides for the member 36. The fork 13 has its side wall 48 connected to the extending portion 39 of the actuating bar 36.

As shown in FIGS. 4 and 5, a sleeve 84 projects from the back wall 26 and is internally threaded for receiving a nut 62 which holds the cover plate 27 in position and serves as the pivot pin for an L-shaped actuating lever 58. The lever 58 has a generally downwardly extending portion with an end 59 about which one end 54 of a spring 52 is engaged. The other end 53 of the spring 52 is received in an opening 51 of the actuating slide bar 36 to actuate it.

A return spring 64 has one end which bears against the upper wall 29 and passes around the member 84 and engages a projection 63 of the member 58 to bias it to its clockwise position relative to FIG. 2 when the control cable is released.

A portion 61 of member 58 extends through the wall 31 of the housing 12 and has a locking fastener 79 for locking the control cable 78 to the member 58. The end 81 of the cable 78 is covered with a protecting member 81. The cable 78 passes through a bracket 76 attached to the wall 31 and a guide cylinder 77 is hollow and allows the protective covering 24 of the cable 78 to be received therein as shown in FIGS. 2 and 3.

A first adjusting screw 68 is threadedly received in the top wall 29 and engages the projection 63 of the member 58 so as to limit its counter clockwise motion to that position shown in FIG. 3. A spring 67 is mounted between the head of the bolt 68 and the wall 29 to bias it such that it remains fixed in its present position and will not vibrate and change its adjustment.

A second set screw 74 is threadedly received in the top wall 29 on the other side of the pivot bolt 62 and has an end 71 which engages a stop 80 on the member 58 to limit the clockwise rotation position of the member 58 as shown in FIG. 2.

In operation when the fork 13 is in the position such that the chain 19 engages the smaller sprocket plate 17 closest to the frame of the bicycle is illustrated in FIGS. 1 and 2. In this position the control cable 78 is released by the control lever, not shown, so that the member 58 moves to the full clockwise position relative to FIG. 2 until the end 71 of adjustment bolt 74 engages the stop 80. A transfer projection 85 is formed on the slide member 36.

In this position of the derailler, the bicycle may be operated with chain 19 on the sprocket 17.

When it is desired to shift gears by moving the chain 19 to the sprocket plate 18 the control lever for the cable 78 is moved to move the cable 78 downwardly relative to FIGS. 2 and 3 thus moving the member 58 to the position shown in FIG. 3 until the stop 63 engages the end of adjustment bolt 68. If the sprocket plates are rotating at the time the member 58 is moved to the position shown in FIG. 3, the slide member 36 will be moved to the position shown in FIG. 3 thus moving the fork 13 upwardly and outwardly from the housing 12 so as to cause the chain 19 to move from the sprocket plate 17 to the sprocket plate 18. The member 36 is driven by the spring 52 since the end 53 of the spring is received in the opening 51 in the member 36. However, if the sprocket plates are not rotating relative to the frame 10 when the attempt to shift gears occurs, the cable 78 will still move the member 58 to the position shown in FIG. 3; however, the fork 13 will not move upwardly and outwardly to the position shown in FIG. 3 because the edge of the chain 19 will bear against the side wall 48 of the fork 13 and the slide member will stay in the position illustrated in FIG. 2 as the member 58 moves to the dotted position shown in FIG. 2. It is to be noted as shown in the dotted position as shown in FIG. 2 that under these conditions the spring 52 is compressed thus exerting a spring bias on the member 36 upwardly and outwardly. However, the member 36 does not move as long as the sprocket plates 17 and 18 are stationary. However, as soon as the sprocket plates are rotated, then the spring bias from the spring 52 will move the member 36 upwardly and outwardly to the position shown in FIG. 3 and the chain 19 will be shifted from sprocket plate 17 to sprocket plate 18.

Thus, it is seen that this invention allows the control cable to be moved to a shifted position without exerting undue stress on the control cable and also provides that once shifting has occurred with the sprocket plates stationary, the spring 52 will provide a bias which will complete the shifting as soon as the sprocket plates commence to rotate.

When it is desired to move the chain 19 from the sprocket plate 18 to the sprocket plate 17, the control lever for the cable 78 will be moved to release tension on the cable 78; and if the sprocket plates 17 and 18 are rotating, the spring 64 will bias the member 58 to the full clockwise position shown in FIG. 2 and the projection 59 will bear against a projection 85 on the end of member 36 and moves the member 36 to the position shown in FIG. 2.

Thus, it is seen that the invention provides a novel front derailler for bicycles which prevents overstressing and breaking of the cable and linkage in the event attempt is made to shift when the sprocket plates are not rotating or when shifting is prevented for any reason. The lost motion connection between the member 58 and the slide bar 36 including the spring 52 prevents and relieves unnecessary and undue stress on the cables 78 and parts of the mechanism. Although the invention has been described with respect to preferred embodiments thereof, it is not to be so limited as changes and modifications may be made which are within the full intended scope as defined by the appended claims.

I claim as my invention:

1. A front derailler mechanism for a bicycle having at least two sprocket plates for moving the drive chain comprising, a displaceable fork engageable with said chain to change it from one to another of said sprocket plates, a control cable mounted on the bicycle and movable to at least two positions, a control unit mounted on the bicycle and connected to said control cable and to said displaceable fork and including means for moving said fork between said sprocket plates under control of said control cable wherein under conditions when said fork is blocked from moving the fork will not move when said control cable is moved but will be subjected to a spring bias so that it moves to the commanded position when blocking has terminated and such that the cable is not subjected to excessive tension forces.

2. A front derailler for a bicycle according to claim 1 wherein said control unit includes a first member to which said control cable is connected to vary its position, a second member supporting said fork and movable to at least two positions, and flexible coupling means between said first and second members which normally allows said first member to move said second member when said first member is moved but which allows said second member to remain stationary when said first member moves if said fork is blocked and which places said second member under a spring bias so as to move it when said fork becomes unblocked.

3. A front derailler for a bicycle according to claim 2 wherein said second member is slidably mounted to said control unit and has one end attached to said fork.

4. A front derailler for a bicycle according to claim 3 wherein said second member moves said fork upwardly and outwardly from said bicycle.

5. A front derailler for a bicycle according to claim 3 wherein said first member is L-shaped and is pivotally attached to said control unit and has a first end attached to said control cable and a second end attached to said flexible coupling means.

6. A front derailler for a bicycle according to claim 5 wherein said flexible coupling means is a first spring with one end attached to said second member and the other end attached to the second end of said first member.

7. A front derailler for a bicycle according to claim 6 including a second spring mounted between said first member and said control unit housing to bias said first member relative to said housing and said control cable.

8. A front derailler for a bicycle according to claim 5 including a pair of limit means engageable with said L-shaped first member to provide angular limits.

* * * * *